Patented May 23, 1944

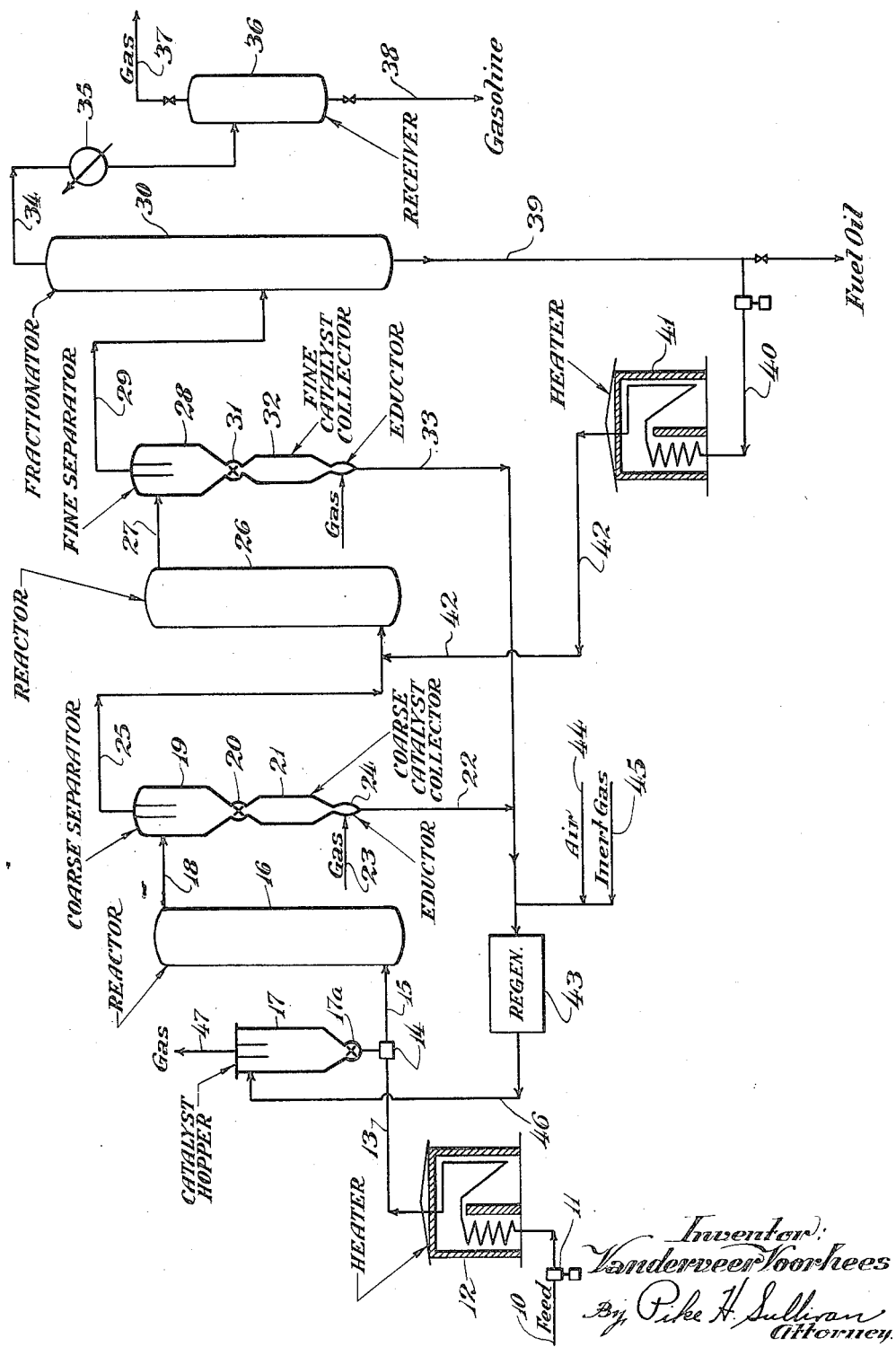

2,349,575

UNITED STATES PATENT OFFICE 2,349,575

CATALYTIC TREATMENT OF VAPORS

Vanderveer Voorhees, Homewood, Ill., assignor to Standard Oil Company, Chicago, Ill., a corporation of Indiana Application October 19, 1940, Serial No. 361,949

8 Claims. (Cl. 196—52)

This invention relates to a process of converting hydrocarbon oils into high knock rating gasoline and particularly to the conversion of petroleum gas oil and heavy naptha of low knock rating into high knock rating gasoline by vapor phase contact with powdered solid contact catalysts suspended therein. The catalysts employed are of the refractory, heterogeneous type in the form of fine granules or powder capable of being suspended in the hydrocarbon vapors.

One object of the invention is to effect more uniform contacting conditions between the catalyst and the hydrocarbon vapors and particularly to effect a more uniform time of contact or catalyst residence time with catalyst particles of different sizes in a powdered catalyst cracking system wherein the catalyst is suspended in an upflow stream of hydrocarbon vapors at conversion temperatures.

In one of its broad aspects my invention contemplates the separation of the powdered catalyst from the vapors in a series of stages, allowing the smaller particles to remain suspended in the vapors in successive contact stages, thereby compensating for the unequal time of contact between small and large particles as the result of differences in sedimentation rate in the initial contacting zone where retarded settling of the catalyst is provided.

The invention is illustrated by the accompanying drawing which shows diagrammatically the layout of a plant for converting hydrocarbon oils in two contacting stages.

Referring to the drawing, feed stock which may be Mid-Continent gas oil with a boiling range of about 550 to 800° F. enters the system through line 10 and is forced by pump 11 through pipe heater 12, thence by transfer line 13 to catalyst mixer 14 and thence by line 15 to the first reaction chamber 16. Steam may be introduced to reduce coke deposition on the catalyst.

Catalyst from supply hopper 17 enters mixer 14 by gravity flow, for example, from a standpipe tower to enhance pressure of catalyst, or by mechanical metering device 17a and is dispersed in the stream of oil vapors in transfer line 13. The temperature of the vapors leaving the furnace 12 may be of the order of 800 to 1050° F., a suitable temperature for the reaction being about 900 to 950° F. If the powdered catalyst from 17 is supplied in a heated condition, it is not necessary to preheat the vapors in furnace 12 to the extent necessary when the catalyst is supplied at a lower temperature. The amount of catalyst added may be about ½ to 10 times the weight of the oil treated although in general the weight ratio of catalyst to oil is about 2 to 5.

The catalyst supplied by hopper 17 may be a natural earth or clay, generally specially activated by treatment with acid, etc. or it may be synthetically prepared, for example, by precipitation of sodium silicate with acids, precipitation of aluminum salts with ammonium oxide, etc. Silica gel promoted with alumina, magnesia or other metal oxide is very satisfactory. In order to handle the catalyst in suspension, it is sometimes necessary to subject it to grinding to obtain the desired degree of fineness. In general, the catalyst which I employ will have a fineness such that substantially all will pass a 50 mesh screen and much of it will pass successively through screens of 100, 200, 300 and 400 mesh. In my process I make no effort to grade the catalyst to a uniform particle size but prefer to employ commercial grades of activated or acid treated clays, silica, silicates, such as aluminum silicate, alumina-silica mixtures, kieselguhr, silica gel, silica gel activated with alumina or magnesia, etc., ground sufficiently fine to remain suspended in the vapor stream during reaction.

The hydrocarbon vapors and suspended catalyst enter the reactor 16 near the bottom and flow upwardly to the outlet 18. In the reactor, temperatures are held at or near the desired conversion temperature, for example, 935° F. and conversion of the hydrocarbons in the vapors is rapidly effected by employing a sufficiently large volume in the reaction chamber and sufficiently low vapor velocity to provide the desired contact time.

The velocity of the vapors passing upwardly through chamber 16 is maintained sufficiently to hold in suspension both coarse and fine particles of catalyst while affording relative sedimentation. A vapor velocity of about 2 to 5 feet per second is usually sufficient although higher or lower velocities may be employed. For example, velocities of ½ to 25 feet per second may be employed, depending to a considerable extent on the density and other properties of the catalyst, the size of the catalyst particles and density of the hydrocarbon vapors passing through the reaction chamber.

From the reaction chamber the products are conducted by line 18 to the coarse catalyst separator 19. This separator may be of the cyclone or centrifugal type with tangential inlet providing a swirling motion for the gases therein. Conditions in separator 19 are regulated to separate a fraction of the catalyst having the larger particles and the separated catalyst passes through valve 20 into collector 21 from where it is conducted by line 22 to be regenerated. For this purpose, it may be carried by means of an inert gas introduced through line 23 into catalyst eductor 24. Stripping with steam or inert gas may be done to remove combustible, volatile contaminants. Screens or other means of effecting the separation of the coarse catalyst fraction may be employed if desired. The amount of the catalyst so separated may be varied, depending on a number of factors and in general, it may be within the range of about 20 to 65% of the total catalyst. The amount of the fraction will be lower in a system of three or more separation stages than in a system with only two stages of separation. The catalyst separated in the first stage may, for example, be about 80 to 200 mesh in the main, while the catalyst separated in the second stage may be 200 mesh and upward in a two-stage process. In another example with a finer catalyst, the first stage may separate up to 325 mesh and the second stage, above 325 mesh.

Leaving separator 19, the vapors carrying a finer fraction of the suspended catalyst pass by line 25 to the second reactor 26 where further conversion takes place. By regulating the relative size of reactors 16 and 26, I may obtain any desired catalyst residence time (catalyst exposure time) with these fractions. The shape of the reactors is also important as it determines vapor velocity. Thus, in a given volume of reaction space, reactor 16 may be elongated to increase the vapor velocity and reduce sedimentation or it may be shortened and widened to decrease the vapor velocity and increase sedimentation or retarded settling, thereby increasing the residence time of the course catalyst without affecting the residence time of the fine catalyst which is carried through the reactor at substantially vapor velocity. The catalyst residence time, which is the average length of time a given particle of catalyst is in contact with the vapors at reaction temperature in the reaction zone, will be greater for lower "space velocities" at a given rate of conversion. Conversion decreases with an increase in "space velocity." Thus, in order to maintain a given rate of conversion at high space velocity, it is necessary to use a short catalyst residence time. For example, at a space velocity of about 2.5 a catalyst residence time of 5 minutes will produce about 50% conversion of East Texas wide boiling range gas oil to gasoline at 900° F. With a residence time of 2 minutes, a "space velocity" of about 12 gave a conversion of practically 34% at 900° F. "Space velocity" is the volume of liquid oil per hour per volume (measured at rest) of catalyst in the reactor at any one instant. The above figures apply to the "space velocity" and residence time for a one reactor system. The two or more stages of the system proposed herein will each contribute to the over all conversion and will therefore each have a combination of catalyst residence time, space velocity and temperature to give the conversion desired.

Reactor 26 is usually larger in diameter than reactor 16 to permit lower vapor velocity and longer residence time with the finer particles as a result of retarded settling. The vapors leaving reactor 26 carry the catalyst by line 27 into separator 28, which is more efficient for separating fine catalyst than separator 19. The vapors, now substantially free of catalyst, pass by line 29 to fractionator 30. The catalyst separated in 28 passes through rotating feeder valve 31 to reservoir 32 and thence by line 33 to regeneration. The separated vapors free of catalyst are fractionated in fractionator 30 into a gasoline and gas fraction which passes overhead by line 34 leading to condenser 35 and receiver 36. From the receiver the gas is conducted away by line 37 and the gasoline is withdrawn by line 38.

The oil heavier than gasoline separated in fractionator 30 may be conducted by line 39 to fuel or a part or all of it may be recycled by line 40 through heater 41 and transfer line 42 back to the second stage reactor 26 where the hot vapors serve to restore the temperature of the reaction mixture. When operated in this way the recycle oil vapors are preferably heated to a high temperature before introducing them to said catalyst chamber. For example, a temperature between 1000 and 1150° F. may be employed.

The second stage reactor may, by this means, be maintained at a higher temperature than the first stage, thereby obtaining more complete utilization of the fine catalyst. The higher carbon deposition from the recycle oil in 42 introduces less difficulty when deposited on the finer catalyst because its small dimensions facilitate burning on regeneration.

The separated catalyst in lines 22 and 33 is conducted into regeneration chamber 43 where it is brought in contact with air or other oxygen-containing gas for the purpose of removing carbonaceous deposits with which it is contaminated. Air for this purpose is introduced by line 44 and an inert gas such as flue gas may be introduced by line 45. Regeneration is carried out at elevated temperatures of about 950 to 1200° F. and the regenerated catalyst is carried by the spent regeneration gases through line 46 back to catalyst hopper 17 where the catalyst is continually being withdrawn and returned to the cracking system. The temperature of regeneration may be controlled by air cooling, by catalyst recycling, or other means. Carbon dioxide and other regeneration products are withdrawn by line 47 and they may be recycled to the regeneration chamber 43 for the purpose of controlling the temperature therein.

The pressure in my conversion system is usually near atmospheric but higher pressures may be employed, of the order of 50 to 100 pounds per square inch and even somewhat higher, for example, 200 pounds per square inch. Varying the pressure has a pronounced effect on the sedimentation of catalyst with a given throughput of oil. Increasing the pressure reduces vapor velocity and thereby permits greater sedimentation in the reaction chambers. Excessive pressure is undesirable partly because of an increase in catalyst contamination resulting from a higher rate of carbon deposition and partly because of a somewhat lower knock rating in the gasoline products.

Having thus described my invention what I claim is:

1. The process of conducting catalytic reactions in gaseous fluids with the aid of suspended, solid contact catalysts consisting of particles of different sizes, which process comprises introducing said gaseous fluids into a vertical elongated reaction zone at the lower part thereof, maintaining said reaction zone at reaction temperature, dispersing finely divided catalysts in said gaseous fluid, maintaining said catalyst in suspension in said gaseous fluid within said reaction zone, flowing said gaseous fluids upwardly through said reaction zone at a velocity sufficiently low to provide for hindered settling of catalyst therein, withdrawing reaction products and catalyst at the upper part of said reaction zone, separating coarse catalyst from fine catalyst and gaseous fluid from said reaction zone, conducting said gaseous fluid and fine catalyst to a second vertical reaction zone maintained at reaction temperature, and therein effecting a further reaction in said gaseous fluids in the presence of said fine catalyst, flowing said gaseous fluids upwardly through said second reaction zone at a velocity sufficiently low to provide for hindered settling of said fine catalyst therein, separating fine catalyst from gases from said second reaction zone, regenerating by combustion with air, both coarse and fine catalyst separated from said gaseous fluids, recycling regenerated catalyst while hot to said reaction zone first mentioned, and recovering the reaction products withdrawn from said second reaction zone.

2. In the process of converting hydrocarbon oils into gasoline of high knock rating by contacting the vapors of said oils with a finely divided solid, porous contact catalyst of heterogeneous particle size suspended in said vapors at a conversion temperature, the improvement comprising dispersing the catalyst in oil vapors in a dispersion zone to produce a given desired concentration of catalyst in the vapors, passing said catalyst and vapors into a first reaction zone of relatively low vapor velocity wherein the vapors and catalyst flow upward, and the concentration of catalyst is greater than in said dispersion zone and hindered sedimentation of the coarse catalyst particles occurs, conducting the partially converted vapors and catalyst to a separation zone where coarse catalyst particles are removed, conducting the remaining vapors and fine catalyst particles to a second reaction zone where further conversion of oil vapors occurs, separating the remaining fine catalyst from said oil vapors and fractionating said oil vapors to produce the desired gasoline of high knock rating.

3. The process of claim 2 wherein the catalyst separated from the hydrocarbon vapors in both stages is regenerated by combustion with oxygen-containing gas and recycled while hot to the first reaction zone.

4. The process of converting hydrocarbon oils by the action of suspended solid catalysts in the vapor phase, comprising heating and vaporizing the oil at a high conversion temperature, suspending in the vapors of said oil a finely divided catalyst consisting of a mixture of coarse and fine particles, effecting conversion of said oil in a first conversion zone through which the oil vapors flow upwardly with said catalyst mixture at relatively low velocity, thereby providing partial sedimentation of larger catalyst particles, separating the said larger catalyst particles from the mixture of catalyst and vapors, subjecting the remaining catalyst and vapors to further conversion in a second low velocity conversion zone, recovering the catalyst from said vapors, fractionating and condensing the vapors to obtain desired hydrocarbon products regenerating the catalyst by controlled combustion and returning it while hot to the conversion system.

5. The process of converting hydrocarbon oils into gasoline of high knock rating which comprises subjecting the vapors of said oils to the action of a solid siliceous catalyst in the form of a powder constituted of non-uniform catalyst particle sizes, effecting partial conversion of the oil with said catalyst in an upflowing stream in a first conversion zone at sufficiently low vapor velocities to permit retarded settling of catalyst of coarser particle size from said vapors separating coarse catalyst from the remaining catalyst and vapors, effecting further conversion of said oil vapors by the action of the remaining catalyst of finer particle size in a second conversion zone at lower vapor velocity, separating the fine catalyst from the vapors, recovering catalyst from both the coarse catalyst separation and the fine catalyst separation, regenerating said catalyst by combustion with oxygen-containing gas, whereby carbonaceous deposits are removed therefrom and recycling said regenerated catalyst while hot into contact with said oil vapors first mentioned.

6. The process of converting higher boiling hydrocarbon oils into high knock rating gasoline by the action of suspended solid catalysts in the vapor phase, comprising suspending in the vapors of said oil at a high conversion temperature a finely divided catalyst of non-uniform particle size, effecting conversion of said oil in a conversion zone through which the oil vapors flow upwardly at relatively low velocity, thereby providing partial sedimentation of larger catalyst particles, separating the said larger catalyst particles from the mixture of catalyst and vapors, subjecting the remaining catalyst and vapors to further conversion in a second low velocity conversion zone, recovering the catalyst from said vapors, separating from said vapors the desired gasoline and a higher boiling distillate oil product, heating said higher boiling oil product to a high conversion temperature and returning it in regulated amounts to said second conversion zone.

7. The process of converting higher boiling hydrocarbon oils into high knock rating gasoline by the action of suspended solid catalysts in the vapor phase, comprising suspending in the vapors of said oil at a high conversion temperature a finely divided catalyst of non-uniform particle size, effecting conversion of said oil in a conversion zone through which the oil vapors flow upwardly at relatively low velocity, thereby providing partial sedimentation of larger catalyst particles, separating the said larger catalyst particles from the mixture of catalyst and vapors, subjecting the remaining catalyst and vapors to further conversion in a second low velocity conversion zone, recovering the catalyst from said vapors, separating from said vapors the desired gasoline and a higher boiling distillate oil product, heating said higher boiling oil product to a higher temperature than that of said first conversion zone and returning it in regulated amounts to said second conversion zone.

8. The process of converting hydrocarbon oils by the action of suspended solid catalysts in the vapor phase, comprising suspending in the vapors of said oil at a high conversion temperature a finely divided catalyst consisting of a mixture of coarse and fine particles, effecting conversion of said oil in a first vertical conversion zone through which the oil vapors flow upwardly with said mixture of coarse and fine catalyst at relatively low velocity, thereby providing partial sedimentation of larger catalyst particles, separating the said larger catalyst particles from the mixture of catalyst and vapors, subjecting the remaining fine catalyst and vapors to further conversion by passing upwardly through a second low velocity vertical conversion zone at a higher temperature and a lower velocity than that of said first conversion zone, recovering the fine catalyst from vapors, fractionating and condensing the vapors to obtain desired hydrocarbon products, regenerating the catalyst by controlled combustion and returning it while hot to the conversion system.

VANDERVEER VOORHEES.